(12) United States Patent
Hongu

(10) Patent No.: US 10,200,594 B2
(45) Date of Patent: Feb. 5, 2019

(54) FOCUS DETECTION APPARATUS, FOCUS ADJUSTMENT APPARATUS, IMAGING APPARATUS, AND FOCUS DETECTION METHOD SETTING FOCUS DETECTION AREA USING RELIABILITY

(71) Applicant: CANON KABUSHIKI KAISHA, Tokyo (JP)

(72) Inventor: Hideyasu Hongu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/682,267

(22) Filed: Aug. 21, 2017

(65) Prior Publication Data
US 2018/0063414 A1 Mar. 1, 2018

(30) Foreign Application Priority Data
Aug. 26, 2016 (JP) .................. 2016-165779

(51) Int. Cl.
| | | |
|---|---|---|
| H04N 5/232 | (2006.01) | |
| G02B 7/09 | (2006.01) | |
| G03B 13/36 | (2006.01) | |
| G02B 7/34 | (2006.01) | |
| H04N 5/225 | (2006.01) | |
| H04N 5/369 | (2011.01) | |

(52) U.S. Cl.
CPC ........... H04N 5/23212 (2013.01); G02B 7/09 (2013.01); G03B 13/36 (2013.01); G02B 7/34 (2013.01); H04N 5/2254 (2013.01); H04N 5/3696 (2013.01)

(58) Field of Classification Search
CPC ....... H04N 5/23212; G02B 7/09; G03B 13/36
See application file for complete search history.

(56) References Cited

U.S. PATENT DOCUMENTS

| | | | | |
|---|---|---|---|---|
| 9,848,117 B2* | 12/2017 | Ishii | ................... | H04N 5/23212 |
| 2012/0237193 A1* | 9/2012 | Kawarada | ................ | G02B 7/34 |
| | | | | 396/95 |
| 2012/0300116 A1* | 11/2012 | Nakamoto | ......... | H04N 5/23212 |
| | | | | 348/349 |
| 2014/0362279 A1* | 12/2014 | Takeuchi | ........... | H04N 5/23212 |
| | | | | 348/349 |

(Continued)

FOREIGN PATENT DOCUMENTS

JP 5690974 B2 3/2015

*Primary Examiner* — Nicholas G Giles
(74) *Attorney, Agent, or Firm* — Canon U.S.A., Inc. IP Division

(57) ABSTRACT

A focus detection apparatus includes a first setting unit configured to set a first focus detection area and a second focus detection area, a first focus detection unit configured to perform focus detection of a phase difference detection method on each of the first and second focus detection areas by using the pair of parallax image signals, a reliability acquisition unit configured to obtain reliability of the focus detection of the first and second focus detection areas by the first focus detection unit, a second setting unit configured to determine a third focus detection area by using the reliability of the focus detection of the first and second focus detection areas, obtained by the reliability acquisition unit, and a second focus detection unit configured to perform focus detection by using the third focus detection area.

20 Claims, 13 Drawing Sheets

(56) References Cited

U.S. PATENT DOCUMENTS

| | | | | |
|---|---|---|---|---|
| 2015/0055011 A1* | 2/2015 | Aoki | ................ | G02B 7/34 |
| | | | | 348/353 |
| 2015/0124157 A1* | 5/2015 | Hongu | ................ | G03B 13/36 |
| | | | | 348/353 |
| 2015/0124158 A1* | 5/2015 | Ishii | ................ | H04N 5/23212 |
| | | | | 348/354 |
| 2016/0212323 A1* | 7/2016 | Ishii | ................ | H04N 5/23212 |

\* cited by examiner

FIG.2A

PIXEL CONFIGURATION FOR NON-IMAGING PLANE PHASE DIFFERENCE DETECTION METHOD

| R | Gr | R | Gr | R | Gr | R | Gr | R | Gr |
|---|----|---|----|---|----|---|----|---|----|
| Gb | B | Gb | B | Gb | B | Gb | B | Gb | B |

FIG.2B

PIXEL CONFIGURATION 1 FOR IMAGING PLANE PHASE DIFFERENCE DETECTION METHOD

| R | R | Gr | Gr | R | R | Gr | Gr | R | R | Gr | Gr | R | R | Gr | Gr | R | R | Gr | Gr |
|---|---|----|----|---|---|----|----|---|---|----|----|---|---|----|----|---|---|----|----|
| A | B | A | B | A | B | A | B | A | B | A | B | A | B | A | B | A | B | A | B |
| Gb | Gb | B | B | Gb | Gb | B | B | Gb | Gb | B | B | Gb | Gb | B | B | Gb | Gb | B | B |
| A | B | A | B | A | B | A | B | A | B | A | B | A | B | A | B | A | B | A | B |

FIG.2C

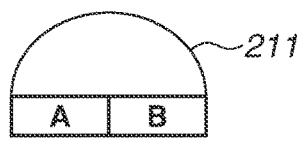

FIG.2D

PIXEL CONFIGURATION 2 FOR IMAGING PLANE PHASE DIFFERENCE DETECTION METHOD

| R | Gr | | Gr | R | Gr | | Gr | R | Gr |
|---|----|---|----|---|----|---|----|---|----|
| Gb | B | Gb | | Gb | B | Gb | | Gb | B |

SHA ... SHA

SHB ... SHB

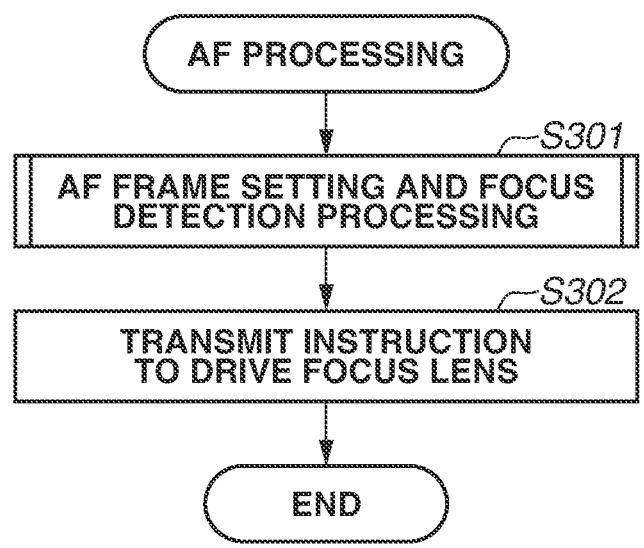

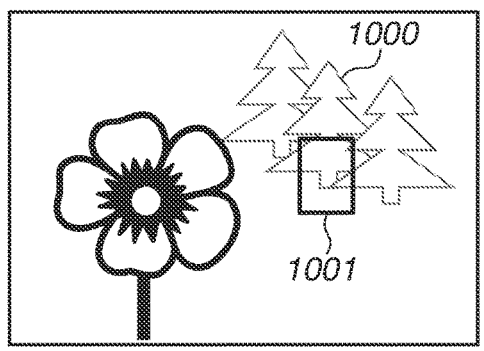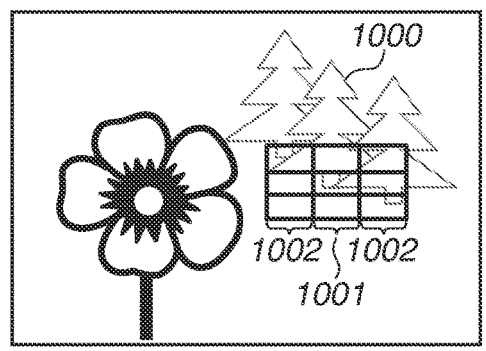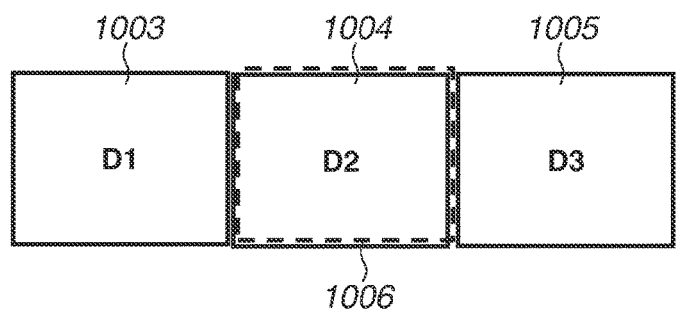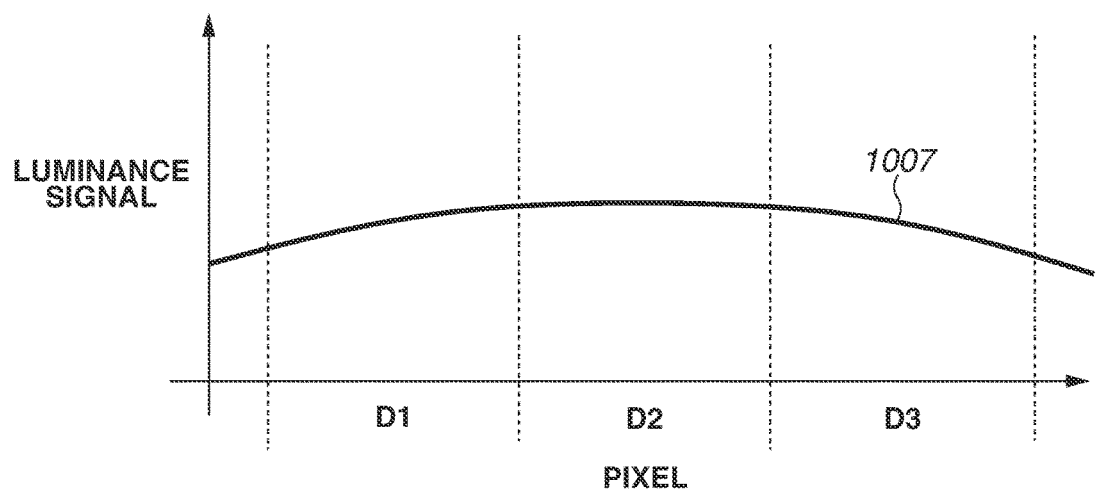

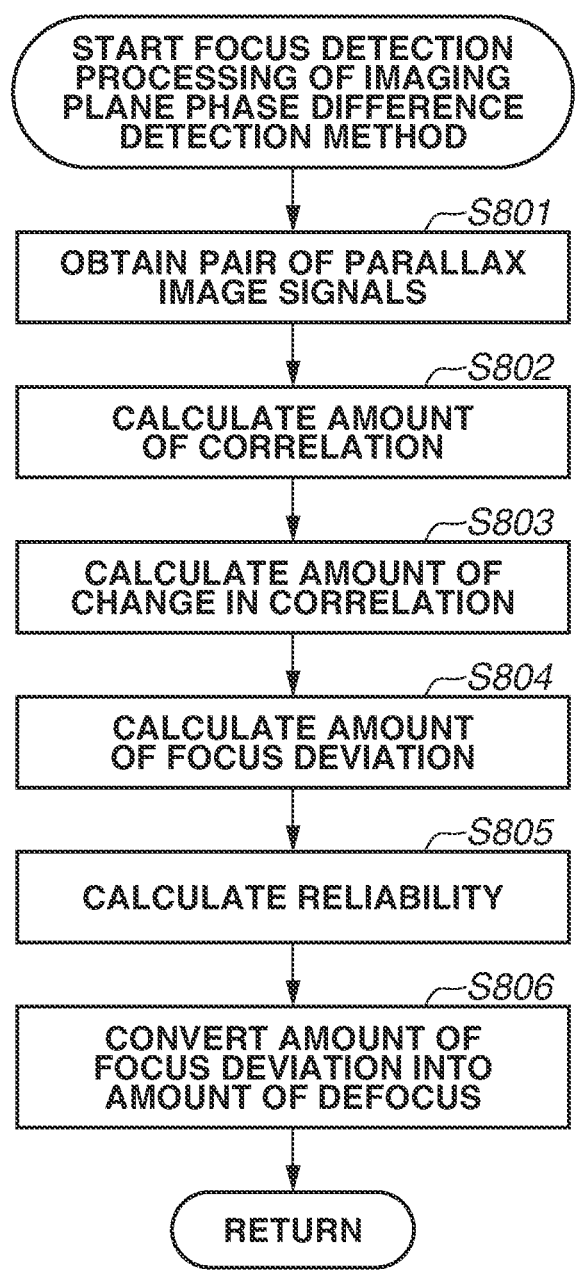

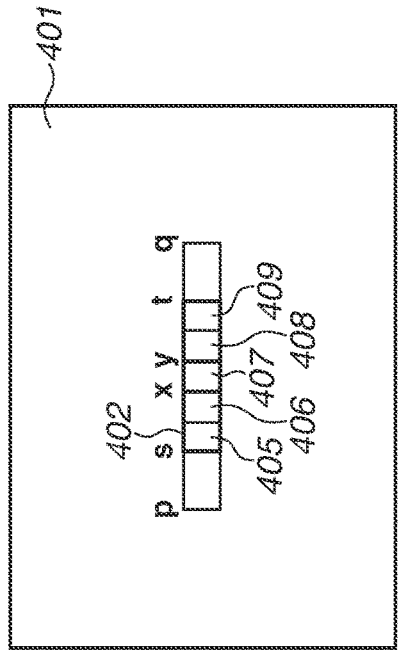
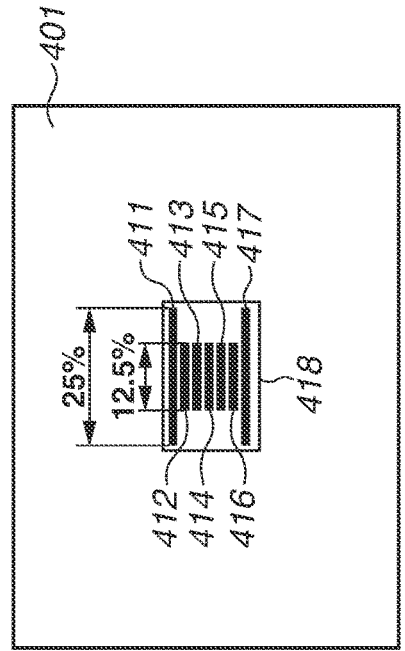
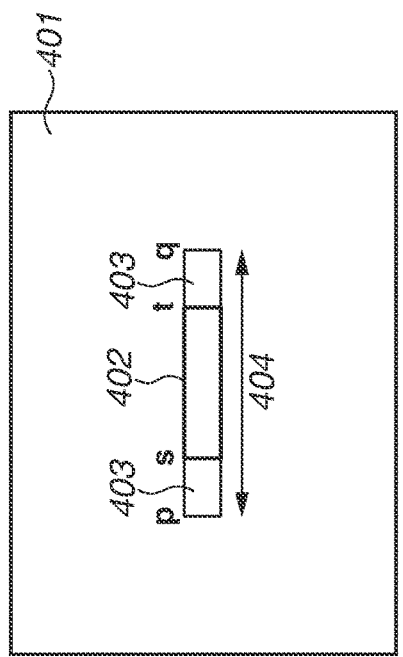
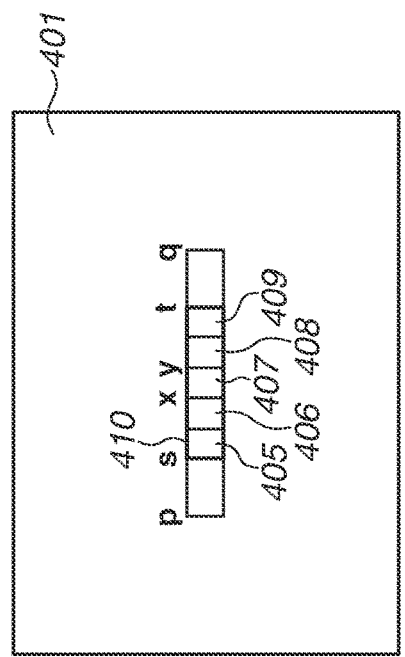

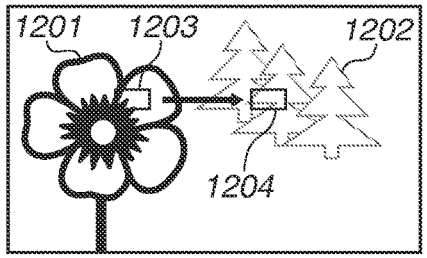
FIG.12A
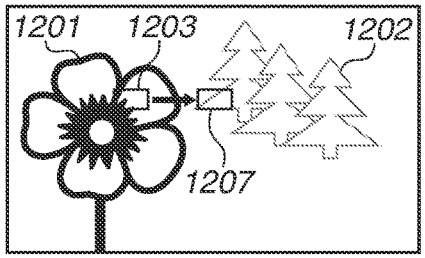
FIG.12E
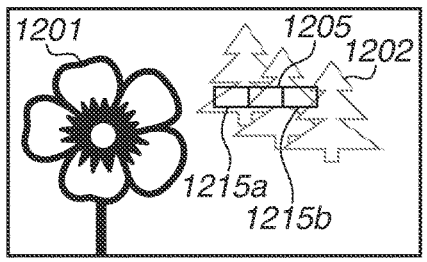
FIG.12B
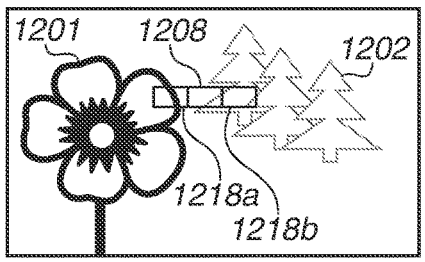
FIG.12F
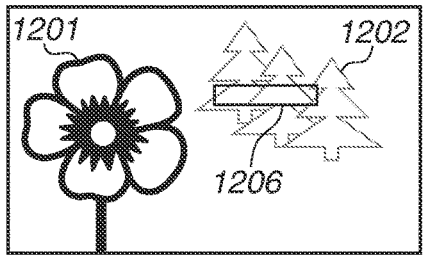
FIG.12C
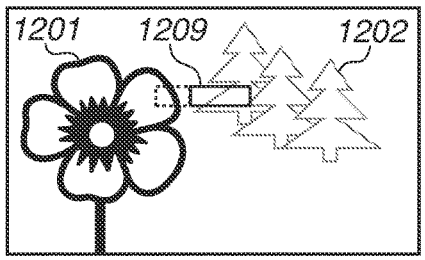
FIG.12G
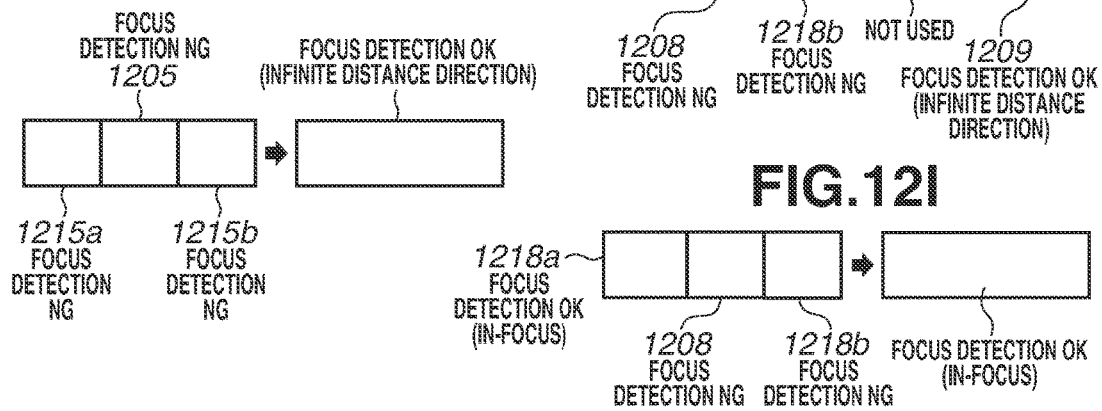
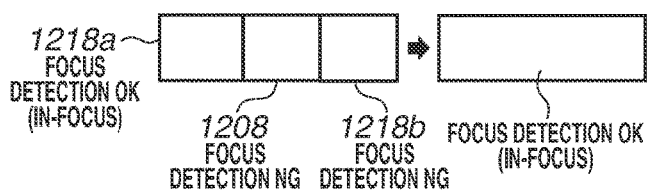

FIG.13A
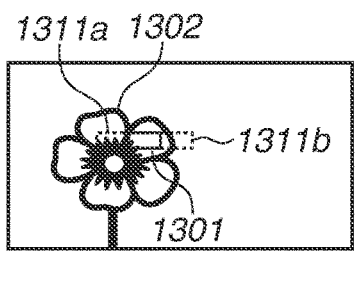

FIG.13C
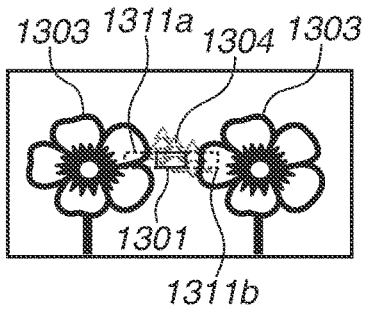

FIG.13E
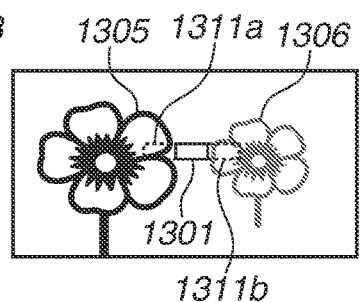

FIG.13B
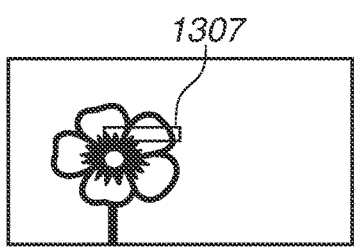

FIG.13D
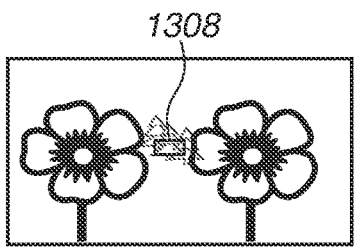

FIG.13F
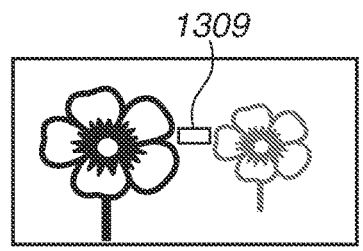

FIG.13G

| | AMOUNT OF DEFOCUS OF SECOND AF FRAME 1311a | AMOUNT OF DEFOCUS OF FIRST AF FRAME 1301 | AMOUNT OF DEFOCUS OF SECOND AF FRAME 1311b | DEGREES OF IN-FOCUS OF SECOND AF FRAMES *1 | DEGREE OF IN-FOCUS BY CONTRAST | RESULT OF AF FRAME CHANGE PROCESSING |
|---|---|---|---|---|---|---|
| SCENE A | 0.2 mm | FOCUS DETECTION NG | 0.2 mm | IN-FOCUS | IN-FOCUS | COMBINE *2 |
| SCENE B | 0.2 mm | FOCUS DETECTION NG | 0.2 mm | IN-FOCUS | OUT-OF-FOCUS | DO NOT COMBINE |
| SCENE C | 0.2 mm | FOCUS DETECTION NG | 5 mm | (PERSPECTIVE CONFLICT) | — | DO NOT COMBINE |

*1: AMOUNT OF DEFOCUS OF 0.4 mm IN IN-FOCUS DEPTH
*2: USE AVERAGE OR USE FOCUS DETECTION RESULT OF HIGHER RELIABILITY

FOCUS DETECTION APPARATUS, FOCUS ADJUSTMENT APPARATUS, IMAGING APPARATUS, AND FOCUS DETECTION METHOD SETTING FOCUS DETECTION AREA USING RELIABILITY

BACKGROUND

Technical Field

The present disclosure relates to a focus detection apparatus, a focus adjustment apparatus, an imaging apparatus, and a focus detection method.

Description of the Related Art

Examples of known focus detection methods of an imaging apparatus include a phase difference detection method using a focus detection element, a contrast detection method using contrast components of an image captured by an image sensor, and an imaging plane phase difference detection method in which focus detection of a phase difference detection method is performed on an image captured by an image sensor.

In the phase difference detection method (including the imaging plane phase difference detection method), light beams each passed through different exit pupil areas of an imaging optical system are received to obtain a pair of parallax image signals. Focus detection is performed by calculating an amount of defocus from a phase difference between the pair of parallax image signals. A focus lens is then moved by a moving amount corresponding to the amount of defocus to achieve an in-focus state.

In automatic focusing (AF), the setting of an area from which an image signal is to be obtained for use in AF (referred to as a focus detection area) is important as well as a method for identifying an in-focus position. In the case of the imaging plane phase difference detection method, a blur of an object image formed on the imaging plane increases as the amount of focus deviation during focus detection increases. In such a case, focus detection is performed with a low-contrast image signal corresponding to the blurred object image. Such focus detection with a small focus detection area may sometimes result in focus detection failure. Japanese Patent No. 05690974 (corresponding to United States Patent Application Publication US2015/0055011) discusses a technique for a focus detection method of the imaging plane phase difference detection method. According to the technique, if focus detection using an image signal of a set focus detection area fails, the focus detection area is extended in a focus detection direction to perform focus detection on a large focus detection area. The focus detection direction refers to a direction in which a pair of image signals is shifted during correlation calculation.

If focus detection is performed using a large focus detection area, the range captured by the focus detection area increases. This heightens the possibility for objects at different distances from the imaging optical system to be included in the range. A state in which objects at different distances from the imaging optical system lie in the range captured by a focus detection area is called a perspective conflict. If there is a perspective conflict, a distance is measured highly erroneously. In such a case, the AF operation may end without focusing on either an object closer to the imaging optical system or an object farther from the imaging optical system. An object not intended by the user may come into focus.

SUMMARY OF THE INVENTION

According to an aspect of the present invention, a focus detection apparatus includes an image sensor including a plurality of photoelectric conversion units and configured to output a pair of parallax image signals and an imaging signal, a first setting unit configured to set a first focus detection area and a second focus detection area with respect to an image based on the imaging signal, the second focus detection area being positioned in a vicinity of the first focus detection area, a first focus detection unit configured to obtain the pair of parallax image signals corresponding to each of the first and second focus detection areas, and perform focus detection of a phase difference detection method on each of the first and second focus detection areas by using the pair of parallax image signals, a reliability acquisition unit configured to obtain reliability of the focus detection of each of the first and second focus detection areas by the first focus detection unit, a second setting unit configured to determine a third focus detection area by using the reliability of the focus detection of the first and second focus detection areas, obtained by the reliability acquisition unit, and a second focus detection unit configured to perform focus detection by using the third focus detection area, wherein the second setting unit is configured to, in a case where the reliability of a focus detection result of the first focus detection area is lower than a first threshold and the reliability of a focus detection result of the second focus detection area is higher than or equal to a second threshold, set the first focus detection area as the third focus detection area.

Further features of the present invention will become apparent from the following description of exemplary embodiments with reference to the attached drawings.

BRIEF DESCRIPTION OF THE DRAWINGS

FIG. 2A is a diagram illustrating a pixel configuration of an image sensor according to a comparative example. FIGS. 2B to 2D are diagrams illustrating a pixel configuration of an image sensor according to the present exemplary embodiment.

FIG. 3 is a flowchart illustrating automatic focusing (AF) processing according to the present exemplary embodiment.

FIGS. 5A to 5D are diagrams for describing a method for setting AF frames according to the present exemplary embodiment.

FIG. 6 is a flowchart illustrating focus detection processing of an imaging plane phase difference detection method according to the present exemplary embodiment.

FIGS. 7A to 7D are diagrams illustrating focus detection areas of imaging plane phase difference AF according to the present exemplary embodiment.

FIGS. 12A to 12I are diagrams for describing an AF frame change processing method according to the present exemplary embodiment.

FIGS. 13A to 13G are diagrams for describing the AF frame change processing method according to the present exemplary embodiment.

DESCRIPTION OF THE EMBODIMENTS

An exemplary embodiment of the present invention will be described in detail below with reference to the accompanying drawings. The exemplary embodiment described below is just an example of means for implementing the present invention, and the present invention is not limited to the following exemplary embodiment. For example, in the following exemplary embodiment, a digital camera system will be described as an example of an imaging apparatus including a focus detection apparatus according to an exemplary embodiment of the present invention. However, the present invention is not limited thereto.

The present exemplary embodiment provides a focus detection apparatus which can reduce the occurrence of a perspective conflict by setting focus detection areas (hereinafter, may be referred to as AF frames) according to an object. Specifically, the focus detection apparatus sets a first detection area (may be referred to as a first AF frame) and a second focus detection area (may be referred to as a second AF frame). The first detection area is used as a focus detection area. The second focus detection area lies in a vicinity of the first focus detection area and serves as a candidate for an area to be used as a focus detection area. If the focus detection apparatus determines that the second focus detection area captures the same object that is captured in the first focus detection area or captures an object located at a distance almost the same as that of the object captured in the first focus detection area, the first and second focus detection areas are set as a focus detection area, and a focusing operation is performed on the focus detection area. On the other hand, if the focus detection apparatus determines that the second focus detection area captures an object located at a distance different from that of the object captured in the first focus detection area, the focusing operation is performed using the first focus detection area as a focus detection area, without using the second focus detection area as a focus detection area. If there is a plurality of second focus detection areas, only a second focus detection area or areas determined that the same object that is captured in the first focus detection area is captured or an object located at almost the same distance as that of the object captured in the first focus detection area is captured may be used as a focus detection area together with the first focus detection area. Setting a focus detection area (may be referred to as a third focus detection area) for use in actual focus detection can reduce the occurrence of a perspective conflict.

The present exemplary embodiment will be described in more specific terms below.

Figure 1:
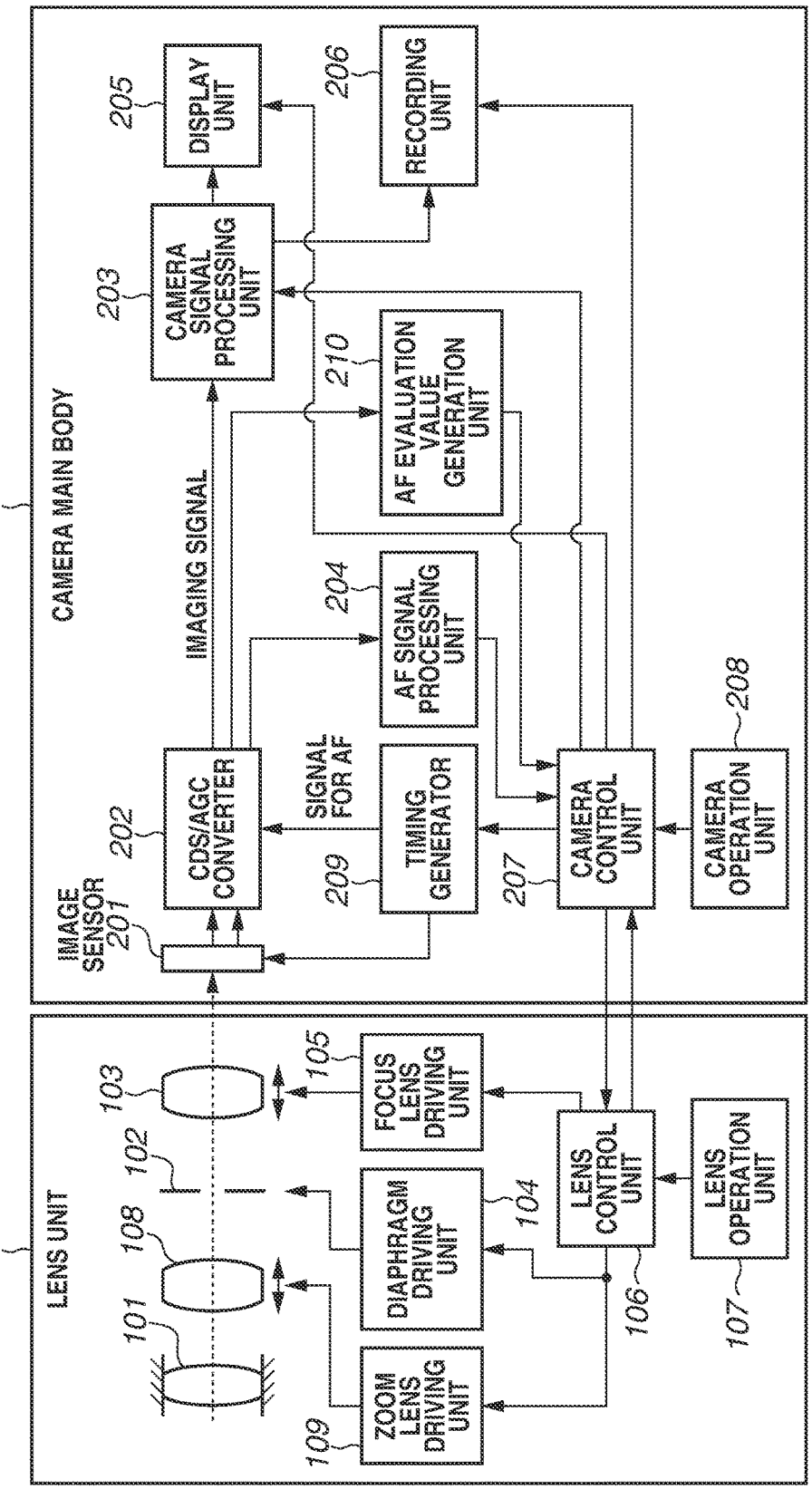
FIG. 1 is a block diagram illustrating a configuration of a camera main body and a lens unit according to an exemplary embodiment.

FIG. 1 is a block diagram illustrating a configuration of an interchangeable-lens camera system including a lens unit and a camera main body according to the exemplary embodiment of the present invention. As illustrated in FIG. 1, the camera system according to the present exemplary embodiment includes a lens unit 10 and a camera main body 20. A lens control unit 106 which controls an operation of the entire lens unit 10 in a centralized manner and a camera control unit 207 which has control over an operation of the entire camera main body 20 communicate data with each other. In the present exemplary embodiment, the camera control unit 207 includes a processor, such as a central processing unit (CPU) and a microprocessor unit (MPU), and a storage unit, such as a memory. The camera control unit 207 may include an arithmetic circuit, and the arithmetic circuit may execute part of arithmetic functions performed by the processor. While the present exemplary embodiment is described using the interchangeable-lens camera system as an example, an exemplary embodiment of the present invention may be applied to a lens integrated camera.

A configuration of the lens unit 10 will be described. The lens unit 10 includes an imaging optical system including a stationary lens 101, a zoom lens 108, a diaphragm 102, and a focus lens 103. A diaphragm driving unit 104 drives the diaphragm 102 to control the amount of light incident on an image sensor 201 to be described below. A focus lens driving unit 105 drives the focus lens 103 for focus adjustment. A zoom lens driving unit 109 drives the zoom lens 108 for zoom adjustment. Alternatively, a lens unit 10 having no zoom function may be used.

The lens control unit 106 controls the diaphragm driving unit 104, the focus lens driving unit 105, and the zoom lens driving unit 109 to determine the amount of opening of the diaphragm 102 and the positions of the focus lens 103 and the zoom lens 108. If a user makes a focusing or zooming operation via a lens operation unit 107, the lens control unit 106 performs control according to the user operation. The lens control unit 106 controls the diaphragm driving unit 104, the focus lens driving unit 105, and the zoom lens driving unit 109 according to control instructions and control information received from the camera control unit 207 to be described below. The lens control unit 106 transmits lens information (for example, information about the imaging optical system) to the camera control unit 207.

Next, a configuration of the camera main body 20 including an automatic focus adjustment apparatus according to the present exemplary embodiment will be described. The camera main body 20 is configured to be able to obtain an imaging signal from a light beam passed through the imaging optical system of the lens unit 10. The image sensor 201 is constituted by using a sensor including a plurality of photoelectric conversion units, such as a charge-coupled device (CCD) sensor and a complementary metal-oxide-semiconductor (CMOS) sensor. The light beam passed through the imaging optical system forms an image on a light receiving surface of the image sensor 201. Photodiodes convert (photoelectrically convert) the formed object image into charges according to the amount of incident light. The charges accumulated in the respective photodiodes are sequentially read out from the image sensor 201 as voltage signals according to the charges, based on driving pulses that are supplied from a timing generator 209 according to a command of the camera control unit 207.

FIGS. 2A and 2B illustrate pixel configurations of part of light receiving surfaces of image sensors. In each diagram, pixels having a spectral sensitivity to green are denoted by Gr or Gb. Pixels having a spectral sensitivity to red are denoted by R. Pixels having a spectral sensitivity to blue are denoted by B. If an image sensor does not support a focus adjustment of an imaging plane phase difference detection method (hereinafter, imaging plane phase difference AF), the image sensor has a Bayer-array pixel configuration such as illustrated in FIG. 2A. On the other hand, the image sensor 201 according to the present exemplary embodiment includes a plurality (in the present exemplary embodiment, two) of photodiodes for each pixel as illustrated in FIG. 2B for the sake of imaging plane phase difference AF. FIG. 2C is a schematic diagram illustrating a cross section of a pixel in the image sensor 201 of the present exemplary embodiment. The image sensor 201 according to the present exemplary embodiment separates a light beam through a microlens 211 to form an image on each of two photodiodes (photodiodes A and B). The image sensor 201 is thus configured to be able to obtain two signals, one for imaging and one for AF. The imaging signal is a signal obtained by adding the signals of the two photodiodes (image signals A+B). The signals of the respective photodiodes (image signal A and image signal B) are two image signals for AF. The photodiodes A and B receive light beams passed through different areas of an exit pupil of the imaging optical system. The image signal B thus has parallax with respect to the image signal A. Such a pair of image signals having parallax therebetween may be referred to parallax image signals.

The acquisition of the two image signals is not limited to the method of separately reading the two image signals. For example, in consideration of the processing load, the signal obtained by adding the pair of parallax image signals (image signals A+B) and either one of the image signals (for example, image signal A) may be read, and the other image signal (for example, the image signal B) may be obtained from a difference therebetween. A total of three signals including the imaging signal and the two signals for AF may be read. The added signal and one of the image signals also have parallax therebetween.

An AF signal processing unit 204 to be described below performs correlation calculation on the two image signals for AF and performs focus detection of a phase difference detection method to calculate the amount of image deviation and various types of reliability information.

In the present exemplary embodiment, each pixel is configured to include two photodiodes. However, the number of photodiodes is not limited to two, and more photodiodes may be included. The configuration of the image sensor 201 supporting the imaging plane phase difference AF is not limited to that of the present exemplary embodiment in which each pixel includes a plurality of photodiodes. As illustrated in FIG. 2D, pixels $S_{HA}$ and $S_{HB}$ for focus detection may be arranged in the image sensor. In such a configuration, each of the pixels $S_{HA}$ and $S_{HB}$ for focus detection includes a single photodiode like the pixels for imaging, and a shielding portion (hatched portion in the diagram) is provided on part (in the case of FIG. 2D, a half) of the light receiving surface. An A signal can be obtained from the pixels $S_{HA}$ for focus detection, and a B signal can be obtained from the pixels $S_{HB}$ for focus detection.

The imaging signal and the signals for AF read from the imaging sensor 201 are input to a correlated double sampling (CDS)/automatic gain control (AGC) converter 202 which performs correlated double sampling for removing reset noise, gain adjustment, and signal digitization. The CDS/AGC converter 202 outputs the imaging signal to a camera signal processing unit 203 and an AF evaluation value generation unit 210, and outputs the signals for imaging plane phase difference AF to the AF signal processing unit 204.

The camera signal processing unit 203 transmits the imaging signal output from the CDS/AGC converter 202 to a display unit 205. The display unit 205 is a display device (display member) constituted by using a liquid crystal display (LCD) or an organic electroluminescence (EL) display. The display unit 205 displays an image based on the imaging signal. In a mode for recording the imaging signal, the imaging signal is recorded into a recording unit 206.

The AF signal processing unit 204 performs correlation calculation based on the two image signals for AF output from the CDS/AGC converter 202, and calculates the amount of image deviation and information about reliability (reliability information). A two-image coincidence level (fnclvl), a two-image steepness (maxder), contrast information, saturation information, and defect information may be used as the information about reliability. The AF signal processing unit 204 outputs the calculated amount of image deviation and reliability information to the camera control unit 207. Details of the correlation calculation will be described below with reference to FIGS. 7A to 9D.

The AF evaluation value generation unit 210 extracts high frequency components from the imaging signal, and generates and outputs an AF evaluation value for use in focus detection of a contrast detection method (hereinafter, contrast AF) to the camera control unit 207. The AF evaluation value indicates sharpness (contrast state) of the image generated based on the signals output from the image sensor 201. The sharpness varies with the focus state (degree of in-focus) of the imaging optical system. The sharpness consequently serves as a signal indicating the focus state of the imaging optical system. The area used to generate the AF evaluation value on the image sensor 201 includes an area corresponding to the areas which are used to generate the image signals for phase difference detection.

The camera control unit 207 exchanges information with and controls the components in the camera main body 20. The camera control unit 207 performs not only the internal processing of the camera main body 20, but also camera functions which are operated by the user, such as power-on/off, a setting change, a start of recording, a start of focus control, and checking of a recorded image, according to input from the camera operation unit 208. As described above, the camera control unit 207 exchanges information with the lens control unit 106 in the lens unit 10, transmits control instructions and control information about the imaging optical system, and obtains information inside the lens unit 10.

Next, a sequence of entire AF processing performed by the camera control unit 207 will be described with reference to FIG. 3. The processing of steps S301 to S302 described below is periodically performed based on an operation period of the camera system.

In step S301, the camera control unit 207 performs AF frame setting and focus detection processing with the AF signal processing unit 204. The AF frame setting and focus detection processing includes setting a focus detection area, i.e., an AF frame, and performing focus detection processing of the imaging plane phase difference detection method by using the set AF frame. Details of the processing will be described below with reference to FIG. 4.

In step S302, the camera control unit 207 transmits an instruction to drive the focus lens 103 to the lens control unit 106 based on an amount of defocus calculated by the focus detection processing of step S301. The AF processing then ends.

Figure 4:
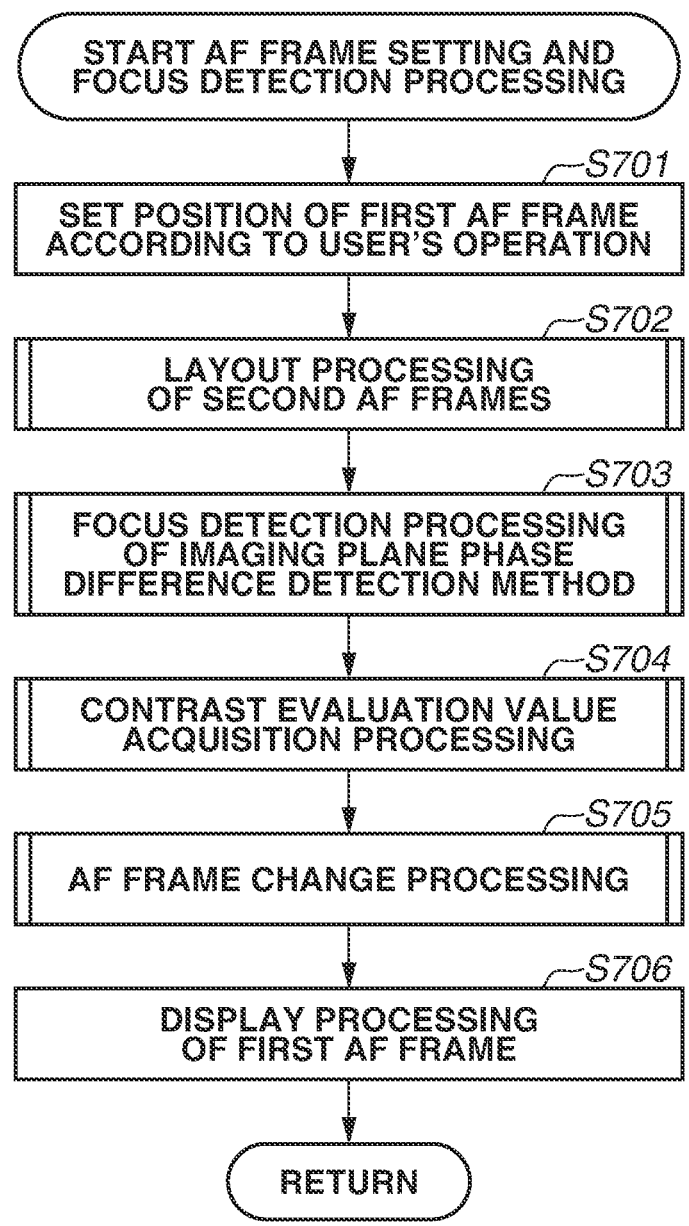
FIG. 4 is a flowchart illustrating AF frame setting and focus detection processing according to the present exemplary embodiment.

Next, the AF frame setting and focus detection processing in step S301 will be described with reference to FIG. 4. FIG. 4 is a flowchart illustrating a processing procedure of the AF frame setting and focus detection processing. In the present exemplary embodiment, the processing (steps S701 to S706) illustrated in FIG. 4 is performed by the camera control unit 207 controlling the AF signal processing unit 204 and the AF evaluation value generation unit 210. However, this is not restrictive. In step S701, the camera control unit 207 sets the position of a first AF frame according to the user's operation. In step S702, the camera control unit 207 performs layout processing of second AF frames in the vicinity of the position of the first AF frame. The AF frames laid out here are candidate AF frames for a third AF frame to be used in actual focus detection. Whether the AF frames constitute the third AF frame is determined using results of the subsequent steps S703 and S704. In step S703, the camera control unit 207 performs focus detection of the imaging plane phase difference detection method on the first and second AF frames (may be referred to collectively as temporary AF frames), and obtains reliability of the focus detection results. In step S704, the camera control unit 207 performs focus detection processing of a contrast method on the first AF frame, and determines a state of an object. In determining the state of the object, the camera control unit 207 determines from contrast information whether the object is in focus and whether the object has low contrast. In step S705, the camera control unit 207 performs setting and focus detection processing of a third AF frame. This processing includes determining and setting a position and size of the third AF frame by using the reliability of the focus detection result in each of the areas constituting the temporary AF frames, and performing focus detection by using the set third AF frame. In step S706, the camera control unit 207 performs display processing of the first AF frame.

The steps S701 to S706 are described in more detail below.

In step S701, the camera control unit 207 sets a first AF frame according to the user's specification of a focus detection range. The first AF frame set here is a unit area in performing the focus detection processing to be described below. The first AF frame constitutes part or all of the third AF frame actually used in focus detection. The camera control unit 207 receives input of the focus detection range from the user via a not-illustrated input unit, and sets the first AF frame. The number of first AF frames to be set may be changed according to the size of the focus detection range. The number of first AF frames may be fixed and the size of the first AF frame(s) may be changed according to the size of the focus detection range. Both the size of the focus detection range and the number of first AF frames may be fixed. There is a plurality of AF modes in which the focus detection range is set. Examples of the modes include a center fixed mode, a frame moving mode, a multi-point mode, and a face priority mode. After the user selects a mode, the focus detection range is specified via a not-illustrated input device. In the face priority mode, the camera main body 20 may detect a face and automatically set a focus detection range with respect to the detected face. In such a case, the user can specify the position of the focus detection range only by selecting the AF mode. A detailed description of the input method and the AF modes will be omitted. In the present exemplary embodiment, a control when the user specifies an arbitrary point will be described as an example.

In step S702, the camera control unit 207 performs the layout processing of second AF frames in the vicinity of the position of the first AF frame. As described above, the second AF frames are candidates AF frame for the third AF frame. The second AF frames laid out here and the first AF frame are used as temporary AF frames for obtaining signals to be used in the focus detection of the imaging plane phase difference detection method (S703) and a signal to be used in the focus detection of the contrast method (S704) to be described below. Details of the layout processing of the second AF frames will be described with reference to FIGS. 5A to 5D.

FIGS. 5A and 5B are diagrams illustrating an imaging range of the camera main body 20. FIGS. 5A and 5B illustrate a captured image obtained in one frame. In FIG. 5A, a first AF frame 1001 is set with respect to an object 1000 (background in the diagram) at a large distance from an in-focus position. A pixel area of the image sensor 201 from which the signals of pixels constituting the interior of the first AF frame 1001 are obtained is set as a pixel area corresponding to the first AF frame 1001. The first AF frame 1001 is a display frame which the user can observe on the display unit 205, such as a monitor. In fact, as illustrated in FIG. 5B, the first AF frame is divided in three (three rows) in a direction perpendicular to the focus detection direction (direction in which a pair of image signals are shifted during correlation calculation; the horizontal direction in the diagram). In step S702, second AF frames 1002 are also arranged on both sides of the first AF frame 1001 in the focus detection direction. Pixels at both ends of the first AF frame 1001 can adjoin pixels at the ends of the second AF frames 1002 on the respective first AF frame sides (in this case, the first AF frame and the second AF frames are referred to as adjoining). The first AF frame and the second AF frames may be several pixels apart. FIG. 5C is an enlarged schematic diagram illustrating one of the three rows of the first AF frame 1001 and the second AF frames 1002. Second AF frames 1003 and 1005 (D1 and D3) are arranged with respect to a first AF frame 1004 (D2). An area 1006 corresponding to the first AF frame 1004, illustrated by the dotted line, is an area from which a contrast evaluation value is to be obtained in step S704 to be described below. In FIG. 5C, the area 1006 coincides with the first AF frame 1004. Although omitted in FIG. 5C, the areas D1 to D3 in the first and second AF frames 1003 to 1005 include a plurality of pixels in the focus detection direction each.

FIG. 5D is a graph illustrating the contrast of an image signal in the areas D1 to D3. The horizontal axis indicates pixels, and the vertical axis a luminance signal. As illustrated in FIG. 5D, since the object 1000 is far from the in-focus position, a difference in a luminance signal 1007 between pixels is small. The contrast in each of the areas D1 to D3 is low, and the luminance signal 1007 does not trace a characteristic shape. In such a case, AF evaluation values in the areas D1, D2, and D3 have no clear characteristics. A degree of reliability of the correlation calculation between the image signals A and B drops, and a degree of reliability of the amount of defocus also drops. However, the area obtained by combining the areas D1 to D3 has a contrast value greater than a contrast value of each of the divided areas D1 to D3. Characteristics become more apparent, and the correlation between the image signals A and B becomes more noticeable. In the present exemplary embodiment, steps S701 and S702 are performed by the camera control unit 207 functioning as a setting unit (first) for setting the first and second AF frames. It is desirable that a plurality of second focus detection areas is set.

Next, the focus detection processing of the imaging plane phase difference detection method and the processing for obtaining the reliability of the focus detection in step S703 will be described with reference to FIG. 6. In step S703, the camera control unit 207 obtains a pair of parallax image signals from each of the first and second AF frames, and performs focus detection of the phase difference detection method on each AF frame. This step is one for performing first focus detection and obtaining the reliability of the focus detection. Step S703 is performed by the camera control unit 207 and the AF signal processing unit 204 functioning as a first focus detection unit and a reliability acquisition unit.

FIG. 6 is a flowchart illustrating a processing procedure of the focus detection processing of the imaging plane phase difference detection method. In the present exemplary embodiment, the focus detection processing illustrated in FIG. 6 is performed by the camera control unit 207. However, this is not restrictive.

In step S801, the camera control unit 207 obtains a pair of parallax image signals from any one of the first and second AF frames set in steps S701 and S702. In step S802, the camera control unit 207 calculates an amount of correlation of the first or second AF frame by performing correlation calculation, using the pair of parallax image signals obtained in step S801.

In step S803, the camera control unit 207 calculates an amount of change in correlation from the amount of correlation calculated in step S802. In step S804, the camera control unit 207 calculates an amount of focus deviation from the amount of change in correlation calculated in step S803.

In step S805, the camera control unit 207 calculates reliability indicating how reliable the amount of focus deviation calculated in step S804 is. In step S806, the camera control unit 207 converts the amount of focus deviation obtained in step S804 into an amount of defocus. The processing of such steps S801 to S806 is performed on each of the AF frames set in steps S701 and S702.

Next, the focus detection processing of the imaging plane phase difference AF described in FIG. 6 will be described in detail with reference to FIGS. 7A to 9D.

FIGS. 7A to 7D are diagrams illustrating examples of areas from which image signals to be handled by the focus detection processing are obtained. FIG. 7A is a diagram illustrating a focus detection range 402 on a pixel array 401 arranged on the light receiving surface of the image sensor 201. An area 404 which is needed to perform correlation calculation is a combination of the focus detection range 402 and shift areas 403 which are needed to perform the correlation calculation. In FIG. 7A, coordinates p to q in an x-axis direction represent the area 404. Coordinates s to t represent the focus detection range 402.

FIG. 7B is a diagram illustrating five first AF frames 405 to 409 into which the focus detection range 402 is divided. For example, in the present exemplary embodiment, the amount of focus deviation is calculated and the focus detection is performed in units of the first AF frames. In the present exemplary embodiment, a focus detection result of the most reliable area among the plurality of divided first AF frames is selected, and the amount of focus deviation calculated in the selected AF frame is used for an actual AF operation. The number of divided first AF frames is not limited to the foregoing.

FIG. 7C is a diagram illustrating an area 410 obtained by connecting the first AF frames 405 to 409 of FIG. 7B. As a modification of the exemplary embodiment, the amount of focus deviation calculated from the area 410 obtained by connecting the first AF frames 405 to 409 may be used for AF.

As illustrated in FIG. 7D, a focus detection range 418 may include a plurality of first AF frames having different lengths. FIG. 7D is a diagram illustrating the layout of the first AF frames. The focus detection range 418 includes seven first AF frames 411 to 417. In FIG. 7D, there are arranged two first frames 411 and 417 having a size of 25% in ratio to that of the imaging screen in the horizontal direction and five first frames 412 to 416 having a size of 12.5%. In such a manner, a plurality of focus detection areas having different sizes is laid out so that the number of areas having a size of 12.5% in ratio to that of the imaging screen>the number of areas having a size of 25%. Focus detection results obtained from the seven first AF frames 411 to 417 are combined with each other to calculate an effective amount of defocus and an effective direction of defocus. The effective amount of defocus and the effective direction of defocus may be used to drive the focus lens 103 for focusing.

In the example of FIG. 7D, the first AF frames 411 to 417 are arranged so that the number of first AF frames 412 to 416 having a low ratio to the imaging range is greater than the number of first AF frames 411 and 417 having a high ratio. This enables better focusing on an object. The low ratio of the first AF frames 412 to 416 to the imaging range reduces the influence of objects at different distances on AF. The arrangement of not only the focus detection areas having a low ratio to the imaging screen but also the focus detection areas having a high ratio reduces focus fluctuations which occur if the object goes out of the focus detection range. More specifically, even if the object temporarily goes out of the focus detection range, the focus detection areas having a high ratio to the imaging screen can continue capturing the object to maintain the focus. The layout and sizes of the focus detection areas are not limited to those described in the present exemplary embodiment, and may be modified without departing from the gist of the present invention.

Figure 8A:
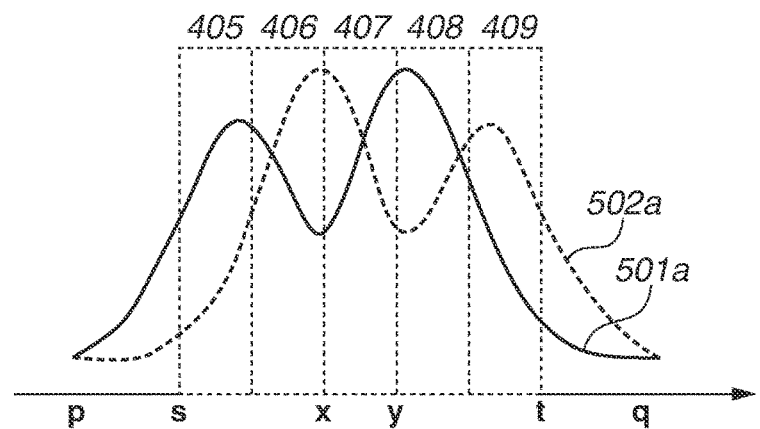
FIGS. 8A to 8C are diagrams illustrating a pair of parallax image signals obtained from focus detection areas according to the present exemplary embodiment.
Figure 8B:
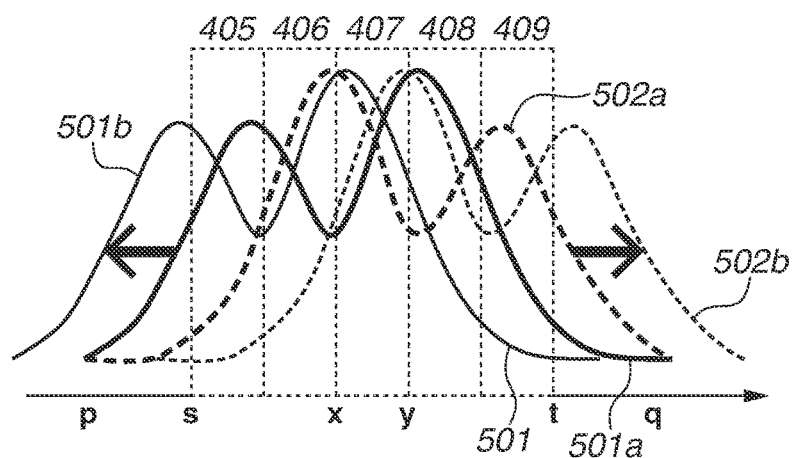
Figure 8C:
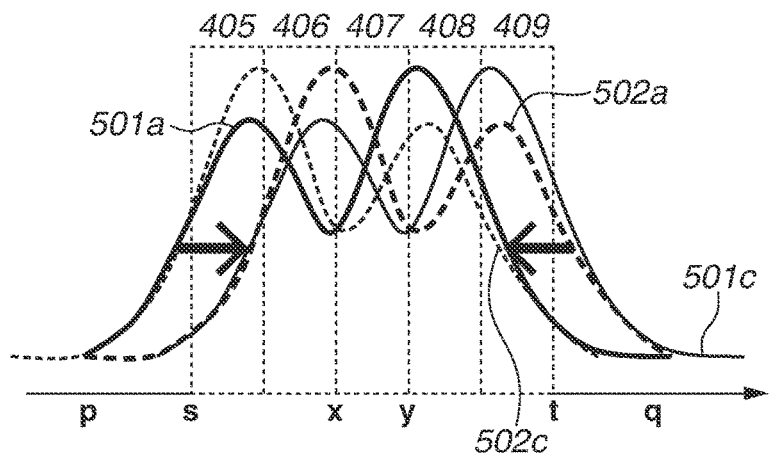

FIGS. 8A to 8C are diagrams illustrating parallax image signals obtained from the focus detection areas, i.e., the first AF frames 405 to 409, set in FIGS. 7B and 7C. The horizontal axis indicates positions in which the image signals are obtained, and the vertical axis indicates luminance. The focus detection range extends from coordinates s to t. The range which is needed for the correlation calculation in view of the shift amounts extends from coordinates p to q. One of the divided first AF frames, the first AF frame 407, ranges from coordinates x to y.

FIG. 8A is a diagram illustrating waveforms of a pair of unshifted parallax image signals. The full line represents a waveform 501a of the image signal A. The broken line represents a waveform 502a of the image signal B. The first AF frames 405 to 409 in FIGS. 7B and 7C are indicated in FIG. 8A.

FIG. 8B is a diagram illustrating waveforms 501b and 502b of the image signals A and B when the waveforms 501a and 502a of the unshifted image signals A and B of FIG. 8A are shifted in positive directions. FIG. 8C is a diagram illustrating waveforms 501c and 502c of the image signals A and B when the waveforms 501a and 502a of the unshifted image signals A and B of FIG. 8A are shifted in negative directions. In calculating the amount of correlation, each of the image signals A and B is shifted in a unit of one bit in a direction indicated by a corresponding arrow.

Next, a method for calculating an amount of correlation COR will be described. As described in FIGS. 8B and 8C, the image signals A and B are successively shifted in units of one bit to calculate the sum of the absolute values of differences between the image signals A and B. The amount of correlation COR can be calculated by the following equation (1):

$$COR[i] = \sum_{k=x}^{y} |A[k+i] - B[k-i]|\{(p-s) < i < (q-t)\}, \quad (1)$$

where i is the amount of shift, p–s is a minimum number of shifts in FIGS. 8A to 8C, q–t is a maximum number of shifts in FIGS. 8A to 8C, x is a start coordinate of the focus detection area, and y is an end coordinate of the focus detection area.

Figure 9A:
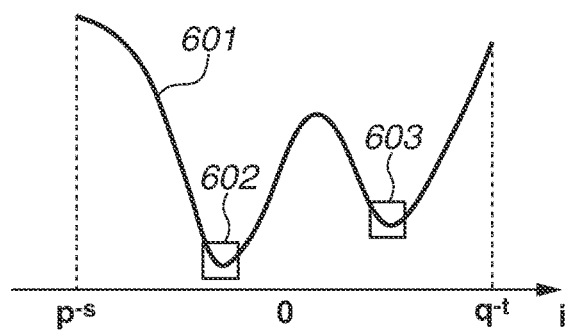
FIGS. 9A to 9D are diagrams for describing a correlation calculation method according to the present exemplary embodiment.

FIG. 9A is a diagram illustrating the amount of correlation as a waveform. The horizontal axis of the graph indicates the amount of shift i. The vertical axis indicates the amount of correlation COR. A waveform 601 of the amount of correlation COR is marked with areas 602 and 603 in the vicinities of extreme values. Between the areas 602 and 603, the area having a smaller amount of correlation COR can be said to have a high degree of coincidence between an A image (image based on the image signal A) and a B image (image based on the image signal B).

Next, a method for calculating an amount of change in correlation ΔCOR will be described. The amount of change in correlation ΔCOR is calculated from a difference in the amounts of correlation COR at every other shift on the waveform 601 of the amount of correlation COR in FIG. 9A. The amount of change in correlation ΔCOR can be calculated by the following equation (2):

$$\Delta COR[i] = COR[i-1] - COR[i+1]\{(p-s+1) \le i \le (q-t-1)\} \quad (2),$$

where i is the amount of shift, p–s is the minimum number of shifts in FIGS. 8A to 8C, and q–t is the maximum number of shifts in FIGS. 8A to 8C.

Figure 9B:
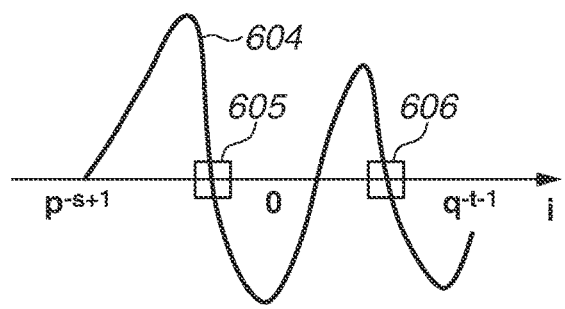

FIG. 9B is a diagram illustrating the amount of change in correlation ΔCOR as a waveform. The horizontal axis of the graph indicates the amount of shift i. The vertical axis indicates the amount of change in correlation ΔCOR. In the waveform 604 of the amount of change in correlation ΔCOR, the amount of change in correlation ΔCOR changes from positive to negative in areas 605 and 606. Such a point where the amount of change in correlation ΔCOR becomes 0 will be referred to as a zero-crossing. The degree of coincidence between the A and B images peaks at a zero-crossing. The amount of shift here is the amount of focus deviation.

Figure 9C:
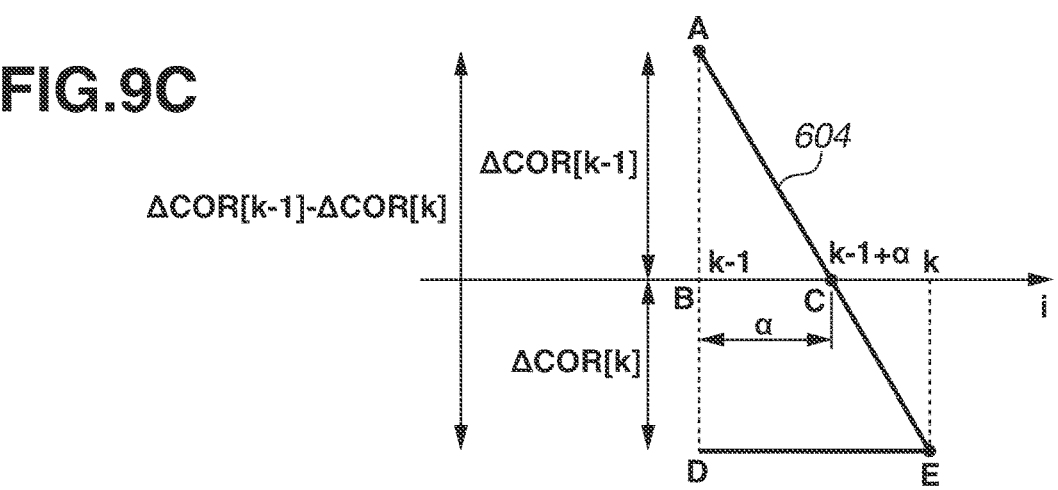

FIG. 9C enlarges the area 605 in FIG. 9B, illustrating a part of the waveform 604 of the amount of change in correlation ΔCOR. A method for calculating an amount of focus deviation PRD will be described with reference to FIG. 9C. The amount of focus deviation PRD is divided between an integral part β and a decimal part α. The decimal part α can be calculated from the relationship of similarity between triangle ABC and triangle ADE in FIG. 9C, by using the following equation (3):

$$AB:AD = BC:DE \quad (3)$$

$$\Delta COR[k-1]:\Delta COR[k-1] - \Delta COR[k] = \alpha:k - (k-1)$$

-continued $$\alpha = \frac{\Delta COR[k-1]}{\Delta COR[k-1] - \Delta COR[k]}.$$

The integral part β can be calculated from FIG. 9C by the following equation (4):

$$\beta = k-1 \quad (4).$$

The amount of focus deviation PRD can thus be calculated as the sum of the decimal part α and the integral part β.

If there is a plurality of zero-crossings (areas 605 and 605) like FIG. 9B, a zero-crossing at which the steepness maxder of a change in the amount of correlation (hereinafter, referred to as steepness) is highest is regarded as a first zero-crossing. The steepness is an index indicating the ease of AF. The higher the value of the steepness, the easier AF on that point is. The steepness can be calculated by the following equation (5):

$$maxder = |\Delta COR[k-1]| + |COR[k]| \quad (5).$$

If there is a plurality of zero-crossings, the first zero-crossing is thus determined according to the steepness. The amount of focus deviation PRD is calculated using the foregoing equations (3) and (4), with the determined first zero-crossing as the zero-crossing.

Next, an example of a method for calculating the reliability of a focus detection result will be described. Since the amount of focus deviation PRD is calculated as the focus detection result, the reliability of the focus detection result can be said to be the reliability of the amount of focus deviation PRD. As described above, a two-image coincidence level, a two-image steepness, contrast information, saturation information, defect information, and the like may be used to determine the reliability of the focus detection result. A method for calculating the two-image coincidence level fnclvl between the image signals A and B will be described. The two-image coincidence level fnclvl is an index indicating the accuracy of the amount of focus deviation PRD. The smaller the value, the higher the accuracy.

Figure 9D:
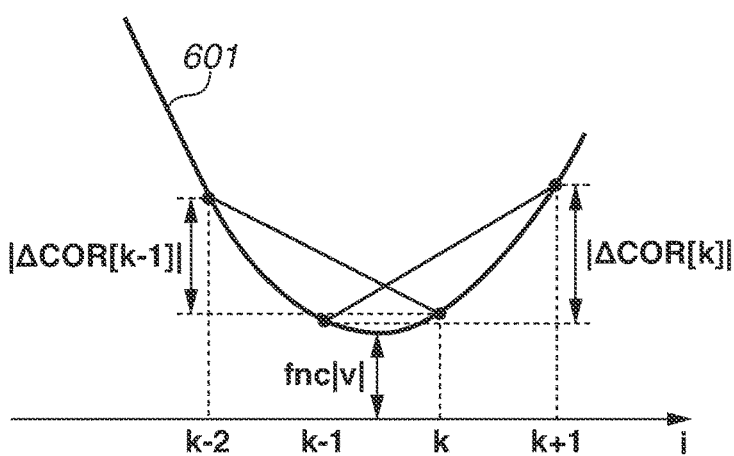

FIG. 9D enlarges the area 602 in FIG. 9A, illustrating a part of the waveform 601 of the amount of correlation COR. The two-image coincidence level fnclvl can be calculated by the following equation (6):

if $|\Delta COR[k-1]| \times 2 \le maxder,$     (i)

$fnclvl = COR[k-1] + \Delta COR[k-1]/4,$ and if $|\Delta COR[k-1]| \times 2 > maxder,$     (ii)

$fnclvl = COR[k] - \Delta COR[k]/4$     (6).

In the present exemplary embodiment, a result of determination of the degree of in-focus using a contrast evaluation value (may be referred to as an AF evaluation value) may be used in setting a third AF frame. The contrast evaluation value of the area corresponding to the first AF frame is thus obtained to determine the degree of in-focus before AF frame change processing. Contrast evaluation value acquisition processing of step S704 will be described. In this processing, the AF evaluation value generation unit 210 extracts a predetermined frequency component from the imaging signal to generate an AF evaluation value, and performs degree of in-focus calculation processing and a low contrast determination. In the present exemplary embodiment, step S704 is performed by the camera control unit 207 and the AF evaluation value generation unit 210 functioning as a contrast information acquisition unit. To generate an AF evaluation value, filter coefficients of a focus signal processing circuit in the AF evaluation value generation unit 210 are set to construct a plurality of band-pass filters having different extraction characteristics. The extraction characteristics refer to the frequency characteristics of the band-pass filters. The setting refers to changing the setting values of the band-pass filters in the focus signal processing circuit. In terms of AF evaluation values, contrast evaluation values to be described below are generated by using conventional techniques. A detailed description of the generation of the AF generation values will thus be omitted.

Figure 10A:
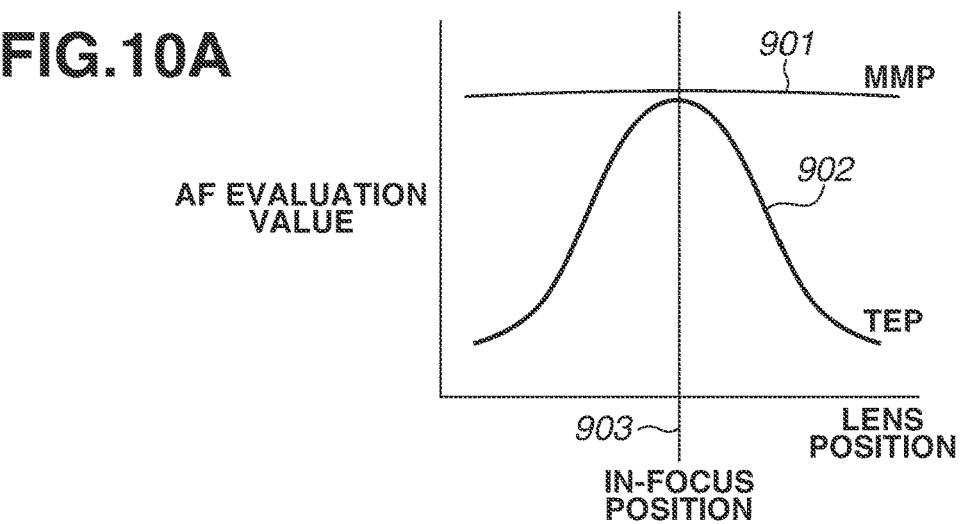
FIGS. 10A to 10C are diagrams illustrating determination of a simplified degree of in-focus and determination of a low contrast object using contrast information according to the present exemplary embodiment.
Figure 10B:
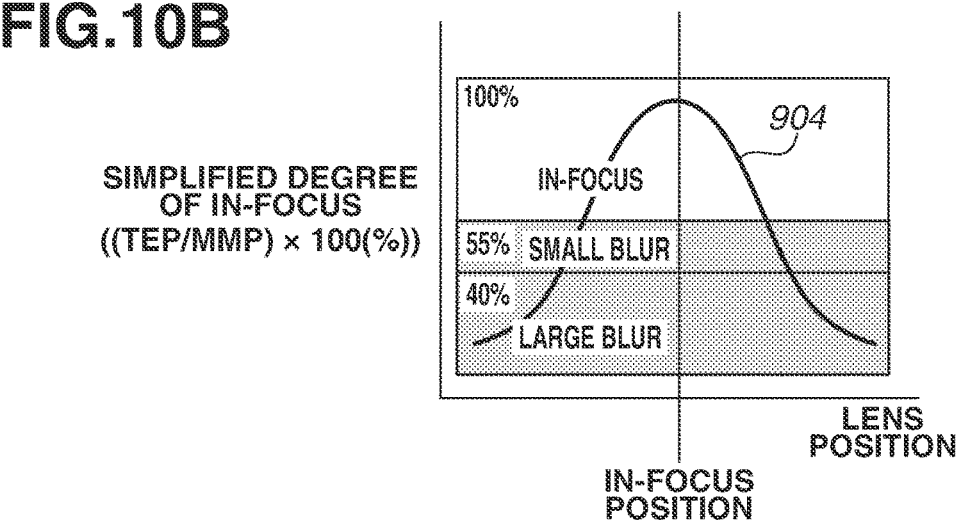
Figure 10C:
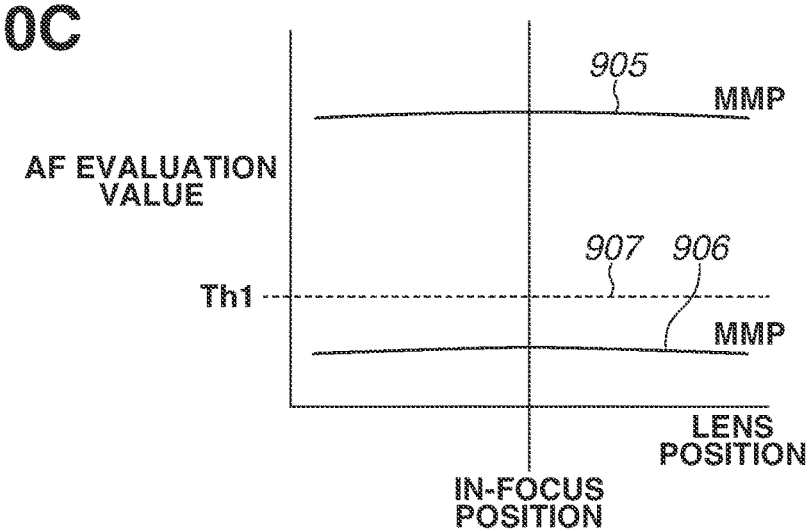

Referring to FIGS. 10A to 10C, the degree of in-focus calculation processing and the low contrast determination will be described. FIG. 10A is a graph of a contrast component generated from the imaging signal. The horizontal axis indicates the position of the focus lens 103, and the vertical axis indicates AF evaluation values. The present exemplary embodiment uses two types of AF evaluation values. One is MMP 901 which indicates a peak-holding value of minimum and maximum values in luminance (difference between the minimum and maximum values). The other is a maximum value TEP 902 of a frequency component extracted when a certain frequency component is extracted from the imaging signal. In the present exemplary embodiment, a frequency band of 1.5 MHz is extracted and used as an example. However, such a value is not restrictive. TEP 902 traces an arch-like curve about an in-focus position 903. As the focus lens 103 approaches an in-focus state from a large blur state, edges of the object become clear, and high frequency components increase compared to low frequency components. TEP 902 thus peaks at the in-focus position 903. Meanwhile, MMP 901 indicating the contrast of the luminance is a peak value and therefore varies little in magnitude unless the object in the screen changes.

FIG. 10B illustrates a simplified degree of in-focus (may also be referred to as a degree of in-focus and a level of in-focus) calculated using such a characteristic. A simplified degree of in-focus 904 is a percentage representation of the magnitude of TEP 902 to MMP 901, determined by dividing TEP 902 by MMP 901. As illustrated in FIG. 10B, the simplified degree of in-focus 904 traces an arch-like curve. In the present exemplary embodiment, the object is determined to be in focus if the magnitude of TEP 902 to MMP 901 is 55% or higher. The object is determined to have a small blur if the magnitude of TEP 902 to MMP 901 is 40% or higher. The object is determined to have a large blur if the magnitude of TEP 902 to MMP 901 is below 40%. Such values are just an example, and the determination thresholds may be changed depending on the object and conditions. The lower the simplified degree of in-focus 904, the more likely the position of the focus lens 103 is off from the in-focus position 903. The higher the simplified degree of in-focus 904, the more likely the position of the focus lens 103 is close to the in-focus position 903.

FIG. 10C illustrates graphs of MMP indicating contrast. The graphs of MMP are used to determine whether the object has high contrast or low contrast. A graph 905 of MMP has contrast higher than a threshold Th1 907 for determination. Such an object is thus determined to have high contrast. A graph 906 of MMP has contrast lower than the threshold Th1 907 for determination. Such an object is determined to have low contrast.

Next, AF frame change processing of step S705 will be described with reference to FIGS. 11 to 13G.

Figure 11:
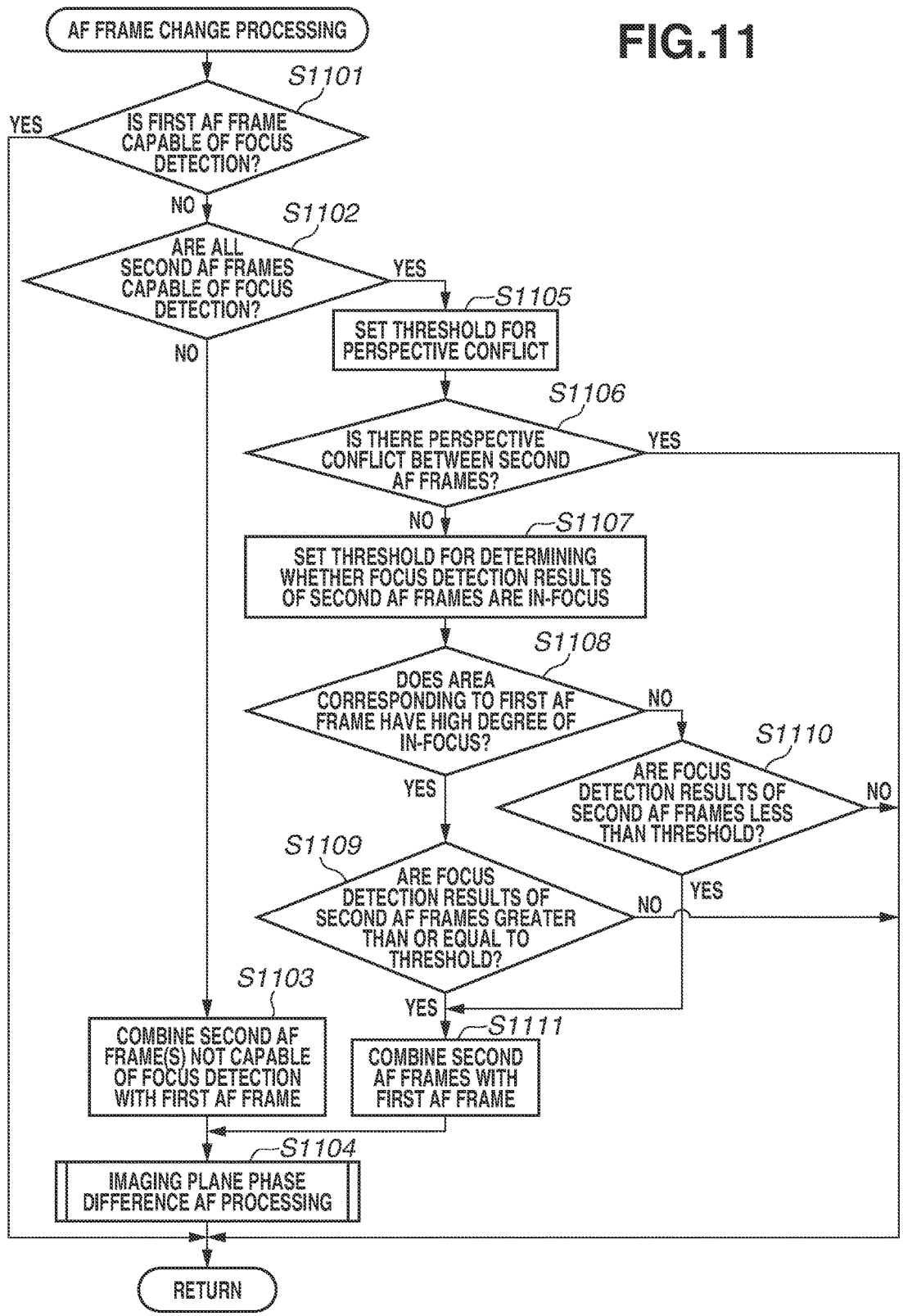
FIG. 11 is a flowchart illustrating AF frame change processing according to the present exemplary embodiment.

FIG. 11 is a flowchart of the AF frame change processing.

In step S1101, the camera control unit 207 determines whether the first AF frame constituting the focus detection range is capable of focus detection. In a case where the first AF frame is capable of focus detection (YES in step S1101), the processing ends without changing the AF frame. In a case where the first AF frame is not capable of focus detection (NO in step S1101), the processing proceeds to step S1102. In a case where there is a plurality of first AF frames, the first AF frames are determined to be capable of focus detection if there is one or more first AF frames capable of focus detection. The processing then ends without changing the AF frames. Being capable of focus detection refers to a state in which the reliability of the focus detection result is higher than or equal to a preset threshold and the focus detection result is determined to be reliable. On the other hand, if the reliability of the focus detection result is lower than the threshold and the focus detection result is determined to be unreliable, the first AF frame is considered to not be capable of focus detection. Being capable of focus detection may be referred to as focus detection OK, and not being capable of focus detection as focus detection NG.

In step S1102, the camera control unit 207 determines whether all the second AF frames are capable of focus detection. In a case where all the second AF frames are capable of focus detection (YES in step S1102), the processing proceeds to step S1105. In a case where not all the second AF frames are capable of focus detection (NO in step S1102), the processing proceeds to step S1103.

In the present exemplary embodiment, if there is a second AF frame or frames not capable of focus detection, the camera control unit 207 determines that the second AF frame(s) is/are likely to capture the object (including a different object at a similar distance from the imaging optical system) that is captured in the first AF frame which is also not capable of focus detection. In step S1103, the camera control unit 207 then identifies the second AF frame(s) not capable of focus detection, and combines the identified second AF frame(s) and the first AF frame into a third AF frame. The processing proceeds to step S1104. In step S1104, the camera control unit 207 performs the same imaging plane phase difference AF processing on the third AF frame as in step S703. The processing thus ends. In step S1104, the camera control unit 207 obtains a pair of parallax image signals from the third AF frame and performs correlation calculation to obtain the amount of correlation of the third AF frame. However, the amounts of correlation of the first and second AF frames constituting the third AF frame may be added to obtain the amount of correlation of the third AF frame. According to an exemplary embodiment of the present invention and the present specification document, the combining of frames also includes such addition of the amounts of correlation of the first and second AF frames. Obtaining the amount of correlation of the third AF frame by adding the amounts of correlation will also be referred to as focus detection using the third AF frame.

In a case where all the second AF frames are capable of focus detection (YES in step S1102), the processing proceeds to step S1105. In steps S1105 and S1106, the camera control unit 207 determines whether there is a perspective conflict between the second AF frames. In a case where there is no perspective conflict (NO in step S1106), the processing proceeds to step S1107. In steps S1107 to S1110, in a case where there is a second AF frame or frames determined to capture the same object that is captured in the first AF frame, the camera control unit 207 combines the second AF frame (s) with the first AF frame. In step S1105, the camera control unit 207 performs processing for setting a threshold for a perspective conflict. The processing proceeds to step S1106. The threshold for a perspective conflict set in step S1105 is one for determining whether the second AF frames capture the same object. In the present exemplary embodiment, to determine whether there is a perspective conflict by using a difference between the amounts of defocus of the second AF frames (D1 and D3 in FIG. 5B), the camera control unit 207 sets a threshold about a difference in the amount of defocus. The threshold is set to be twice the focal depth.

In step S1106, the camera control unit 207 determines whether there is a perspective conflict between the second AF frames by using the threshold set in step S1105. The camera control unit 207 compares the difference between the amounts of defocus of the second AF frames with the threshold for a perspective conflict. In a case where the comparison result shows that the difference is below the threshold, the camera control unit 207 determines that there is no perspective conflict (NO in step S1106), and the processing proceeds to step S1107. In a case where the comparison result shows that the difference is greater than or equal to the threshold, the camera control unit 207 determines that there is a perspective conflict (YES in step S1106), and the processing ends without changing the AF frames.

In step S1107, the camera control unit 207 sets a threshold for determining whether the focus detection results of the second AF frames are in-focus or out-of-focus. In the present exemplary embodiment, the threshold is set to be five times the focal depth. In step S1108, the camera control unit 207 determines whether an area corresponding to the first AF frame has a high degree of in-focus (in an in-focus state) or not (in an out-of-focus state) by using the contrast evaluation value obtained in step S704. The area corresponding to the first AF frame is an area that coincides with the first AF frame used for focus detection of the phase difference detection method to an extent that whether the first AF frame is in an in-focus state can be determined. A predetermined threshold may be used for the determination. In a case where the area is in an in-focus state (YES in step S1108), the processing proceeds to step S1109. In a case where the area is not in an in-focus state (NO in step S1108), the processing proceeds to step S1110.

In step S1109, the camera control unit 207 determines whether the focus detection results of the second AF frames are greater than or equal to the threshold set in step S1107. If the focus detection results are greater than or equal to the threshold (the second AF frames are in an in-focus state) (YES in step S1109), the processing proceeds to step S1111. If not (NO in step S1109), the AF frame change processing ends without combining the AF frames.

In step S1110, the camera control unit 207 determines whether the focus detection results of the second AF frames are below the threshold set in step S1107. In a case where the focus detection results are below the threshold (the second AF frames are in an out-of-focus state) (YES in step S1110), the processing proceeds to step S1111. In a case where the focus detection results are not below the threshold (NO in step S1110), the AF frame change processing ends without combining the AF frames.

In step S1111, the camera control unit 207 combines the second AF frames and the first AF frame into a third AF frame. The processing proceeds to step S1104. In step S1104, the camera control unit 207 performs the imaging plane phase difference AF processing on the third AF frame and obtains a focus detection result. In short, the first and second AF frames are combined with each other if there is no perspective conflict between the first and second AF frames and the in-focus/out-of-focus determination result of the first AF frame by the contrast method coincides with the in-focus/out-of-focus determination results of the second AF frames by the imaging plane phase difference detection method.

FIGS. 12A to 12I are diagrams for describing an effect of an exemplary embodiment of the present invention. FIGS. 12A to 12I illustrate a scene in which an in-focus object (flower) 1201 and an out-of-focus object (trees) 1202 are included.

Suppose, in FIG. 12A, that the user moves a displayed focus detection range 1203 to a position 1204. In steps S701 and S702, the camera control unit 207 sets a first AF frame 1205 and second AF frames 1215 (1215a and 1215b) as illustrated in FIG. 12B (the focus detection range is assumed to be small enough to perform focus detection without division). In such a scene, the object 1202 captured by the first AF frame 1205 has a large blur. In step S703, the camera control unit 207 thus performs the focus detection of the imaging plane phase difference detection method on each of the first and second AF frames 1205, 1215a, and 1215b. As illustrated in FIG. 12D, the focus detection is likely to end up with focus detection NG. In the present exemplary embodiment, in steps S1101, S1102, S1103, and S1104, the camera control unit 207 combines the three AF frames ending up with focus detection NG into one and obtains the amount of correlation thereof. This increases the possibility of focus detection OK. The reason is that the AF frame is horizontally extended. In the scene of FIG. 12B, a total of three frames including the moved first AF frame 1205 and the two second AF frames 1215 are combined into a frame 1206 illustrated in FIG. 12C. The use of such a frame 1206 as a focus detection area can increase the possibility of focus detection OK.

Next, a case in which the user moves the focus detection area 1203 to a position 1207 in FIG. 12E will be described. Here, the moved first AF frame 1208 and second AF frames 1218 (1218a and 1218b) are set as illustrated in FIG. 12F. In such a scene, the first AF frame 1208 and the second AF frame 1218b on the right in the diagram capture the object 1202 having a large blur. The second AF frame 1218a on the left in the diagram captures the object 1201 in focus. As illustrated in FIG. 12H, the focus detection result is likely to include frames of focus detection NG (frames capturing the object 1202) and a frame of focus detection OK (frame capturing the object 1201). As illustrated in FIG. 12I, if the three frames are combined into one for focus detection, distance measurement is likely to not be successfully performed due to a perspective conflict. In such a scene, since there is a frame in which the focus detection result is determined to be near in-focus, the focus detection on the three AF frames combined with each other may be affected by that frame and result in a determination that the combined frame is in an in-focus state.

In the present exemplary embodiment, in steps S1102 and S1103, if the second AF frames include a frame of focus detection NG, the camera control unit 207 combines only the frame of focus detection NG and the first AF frame into a third AF frame 1209 illustrated in FIG. 12G. As illustrated in FIG. 12H, the two frames of focus detection NG are combined into one frame while the area of focus detection OK is unused for focus detection. This can avoid the effect of a perspective conflict. In such a case, the combined frame includes no frame near in-focus, and the focus detection result is likely to be an infinite distance direction. In such a manner, in the case of a perspective conflict state, whether the AF frames are capable of focus detection is identified, and only an incapable second AF frame is combined with the first AF frame. This horizontally extends the AF frame and increases the possibility of focus detection OK.

Next, a case in which the first AF frame is focus detection NG and the adjoining second AF frames are focus detection OK will be described with reference to FIGS. 13A to 13G. FIG. 13A illustrates a scene (scene A) in which a first AF frame 1301 and second AF frames 1311 (1311a and 1311b) are set with respect to an object 1302 near in-focus. In the scene A, a part of the object 1302 with fewer features is captured in the first AF frame 1301, and the focus detection result of the first AF frame 1301 is NG. Both the adjoining second AF frames 1311 are focus detection OK, and the amounts of defocus thereof are successfully calculated. In such a scene, whether to combine the second AF frames 1311 with the first AF frame is determined according to the result of determination of the degree of in-focus using the contrast evaluation value of the area corresponding to the first AF frame 1301 (step S1108) and the result of determination of the degrees of in-focus of the second AF frames 1311 (steps S1109 and S1110). In a case where the first AF frame 1301 is determined to be in an in-focus state from the contrast evaluation value of the corresponding area and the focus detection results of the second AF frames 1311 are near in-focus, the first and second AF frames 1301 and 1311 are combined with each other. If the first AF frame 1301 is determined to be in an out-of-focus state from the contrast value of the corresponding area and the focus detection results of the second AF frames 1311 (the degrees of in-focus of D1 and D3) are not near in-focus, the first and second AF frames 1301 and 1311 are combined with each other. In the scene A, as illustrated in FIG. 13G, the degree of in-focus determined from the contrast evaluation value (degree of in-focus by contrast) and the degrees of in-focus of the two second AF frames 1311 are all coincidentally in-focus. The processing then proceeds to steps S1108, S1109, and S1111. As illustrated in FIG. 13B, the third AF frame 1307 which is the first and second AF frames 1301 and 1311 combined with each other is used to perform focus detection. For the object in the scene A, an average of the focus detection results of the second AF frames 1311a and 1311b may be used. Alternatively, the focus detection result of higher reliability may be used. In either case, a perspective conflict can be avoided.

FIG. 13C illustrates a scene (scene B) in which the first AF frame 1301 and the second AF frames 1311 are set with respect to objects 1303 near in-focus and an object 1304 in a distant place. The first AF frame 1301 captures the object 1304. The two second AF frames 1311 capture the objects 1303. In the case of the scene B, as illustrated in FIG. 13G, the degree of in-focus by contrast and the degrees of in-focus of the second AF frames 1311 do not coincide. The processing then proceeds to steps S1108 and S1110. Focus detection is performed using the first AF frame 1301 as the third AF frame 1308, without combining the AF frames (FIG. 13D). This can avoid a perspective conflict.

FIG. 13E illustrates a scene (scene C) in which the first AF frame 1301 is set between an object 1305 near in-focus and an object 1306 in a distant place. One of the second AF frames (1311a) captures the object 1305. The other (1311b) captures the object 1306. In the scene C, as illustrated in FIG. 13G, there is a perspective conflict between the focus detection results of the second AF frames. The processing then proceeds to YES in step S1106, and focus detection is performed using the first AF frame 1301 as a third AF frame 1309 (FIG. 13F). This can avoid a perspective conflict.

As described above, whether to combine the first and second AF frames is determined and the third AF frame is set according to the correlation between the focus detection results of the first and second AF frames and the degree of in-focus by contrast. The effect of the present exemplary embodiment can thus be obtained in various scenes. In the present exemplary embodiment, step S705 is performed by the camera control unit 207 functioning as a setting unit (second).

Returning to FIG. 4, in step S706, the camera control unit 207 performs display processing of the first AF frame. The purpose is to visually display the first AF frame specified by the user. In the present exemplary embodiment, the third AF frame different from the first AF frame set by the user is internally set. However, the processing for continuing to display the first AF frame set by the user on the display unit 205 is performed without notifying the user of the internally set third AF frame.

An exemplary embodiment of the present invention may be carried out in the following manner. A storage medium storing software program code describing a procedure for implementing the functions of the foregoing exemplary embodiment is supplied to a system or an apparatus. A computer (or a processor, such as a CPU and an MPU) of the system or apparatus reads and executes the program code stored in the storage medium. In such a case, the program code itself read from the storage medium implements the novel functions of the exemplary embodiment of the present invention. The storage medium storing the program code and the program code constitute the exemplary embodiment of the present invention.

Examples of the storage medium for supplying the program code include a flexible disk, a hard disk, an optical disk, a magnetooptical disk, and the like. A compact disc read only memory (CD-ROM), a compact disc recordable (CD-R), a compact disc rewritable (CD-RW), a digital versatile disk read only memory (DVD-ROM), a digital versatile disc random access memory (DVD-RAM), a digital versatile disc rewritable (DVD-RW), a digital versatile disk recordable (DVD-R), a magnetic tape, a nonvolatile memory card, a read only memory (ROM), and the like may also be used.

The program code read by the computer is made executable to implement the functions of the foregoing exemplary embodiments. An operating system (OS) running on the computer may perform part or all of actual processing based on instructions of the program code so that the functions of the foregoing exemplary embodiments are also implemented by the processing.

The following case is also applicable. The program code read from the storage medium is initially written to a memory provided on a function expansion board inserted into the computer or a function expansion unit connected to the computer. A CPU provided on the function expansion board or the function expansion unit then performs part or all of actual processing based on instructions of the program code.

A focus adjustment apparatus according to an exemplary embodiment of the present invention includes the foregoing focus detection apparatus, and a focus lens control unit which controls the position of the focus lens included in the imaging optical system by using the focus detection result of the third focus detection area obtained by the focus detection apparatus. Like an interchangeable-lens camera, the imaging optical system may be configured separately from the focus detection apparatus. In such a case, the focus detection apparatus transmits position information about the focus lens to the imaging optical system. The imaging optical system includes a moving unit which moves the position of the focus lens. Based on the position information about the focus lens transmitted from the focus adjustment apparatus, the moving unit can move the focus lens for focus adjustment. An imaging apparatus according to an exemplary embodiment of the present invention may include the foregoing focus adjustment apparatus, an image generation unit which generates an image from an image signal, and a recording section which records the image into a recording unit. For example, an external storage device may be used as the recording unit.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-165779, filed Aug. 26, 2016, which is hereby incorporated by reference herein in its entirety.

What is claimed is:

1. A focus detection apparatus comprising:
an image sensor including a plurality of photoelectric conversion units and configured to output a pair of parallax image signals and an imaging signal; and
at least one processor or one circuit with functions as:
a first setting unit configured to set a first focus detection area and a second focus detection area with respect to an image based on the imaging signal, the second focus detection area being positioned in a vicinity of the first focus detection area;
a first focus detection unit configured to obtain the pair of parallax image signals corresponding to each of the first and second focus detection areas, and perform focus detection of a phase difference detection method on each of the first and second focus detection areas by using the pair of parallax image signals;
a reliability acquisition unit configured to obtain reliability of the focus detection of each of the first and second focus detection areas by the first focus detection unit;
a second setting unit configured to determine a third focus detection area by using the reliability of the focus detection of the first and second focus detection areas, obtained by the reliability acquisition unit; and
a second focus detection unit configured to perform focus detection by using the third focus detection area,
wherein the second setting unit is configured to, in a case where the reliability of a focus detection result of the first focus detection area is lower than a first threshold and the reliability of a focus detection result of the second focus detection area is higher than or equal to a second threshold, set the first focus detection area as the third focus detection area,
wherein the reliability of the focus detection of the first focus detection area is at least one of coincidence level, steepness, and contrast information of the pair of parallax image signals corresponding to the first focus detection area, and
wherein the reliability of the focus detection of the second focus detection area is at least one of coincidence level, steepness, and contrast information of the pair of parallax image signals corresponding to the second focus detection area.

2. The focus detection apparatus according to claim 1, wherein the second setting unit is configured to, in a case where the reliability of the focus detection result of the first focus detection area is lower than the first threshold and the reliability of the focus detection result of the second focus detection area is lower than the second threshold, set the second focus detection area of which the reliability is lower than the second threshold and the first focus detection area as the third focus detection area.

3. The focus detection apparatus according to claim 1, wherein the first setting unit is configured to set a plurality of second focus detection areas, and
wherein the second setting unit is configured to set a second focus detection area or areas of which the reliability is lower than the second threshold among the plurality of second focus detection areas and the first focus detection area as the third focus detection area.

4. The focus detection apparatus according to claim 3, wherein the second setting unit is configured to, in a case where the plurality of second focus detection areas includes a focus detection area or areas of which the reliability is higher than or equal to the second threshold and a second focus detection area or areas of which the reliability is lower than the second threshold, not set the second focus detection area or areas of which the reliability is higher than or equal to the second threshold as the third focus detection area.

5. The focus detection apparatus according to claim 1, wherein the second setting unit is configured to, in a case where the reliability of the focus detection result of the first focus detection area is higher than or equal to the first threshold, set the first focus detection area as the third focus detection area.

6. The focus detection apparatus according to claim 1, wherein the processor or the circuit further functions as a contrast information acquisition unit configured to obtain contrast information about an area corresponding to the first focus detection area and determine whether the first focus detection area is in an in-focus state, wherein the first focus detection unit is configured to determine whether the second focus detection area is in an in-focus state from a result of the focus detection of the phase difference detection method, and wherein the second setting unit is configured to set the third focus detection area by using a determination result of the in-focus state of the first focus detection area obtained by the contrast information acquisition unit and a determination result of the in-focus state of the second focus detection area obtained by the first focus detection unit.

7. The focus detection apparatus according to claim 6, wherein the second setting unit is configured to, when the reliability of the focus detection result of the first focus detection area is lower than the first threshold and the reliability of the focus detection result of the second focus detection area is higher than or equal to the second threshold, set the first and second focus detection areas as the third focus detection area in a case where the determination result of the in-focus state of the first focus detection area by the contrast information acquisition unit coincides with the determination result of the in-focus state of the second focus detection area by the first focus detection unit, and set the first focus detection area as the third focus detection area in a case where the determination result of the in-focus state of the first focus detection area by the contrast information acquisition unit does not coincide with the determination result of the in-focus state of the second focus detection area by the first focus detection unit.

8. The focus detection apparatus according to claim 6, wherein the first setting unit is configured to set a plurality of second focus detection areas, wherein processor or the circuit further functions as a comparison unit configured to compare a difference between detection results of the plurality of second focus detection areas by the first focus detection unit with a third threshold, and wherein the second setting unit is configured to set the third focus detection area by using a comparison result of the comparison unit.

9. The focus detection apparatus according to claim 1, wherein the second focus detection unit is configured to perform focus detection of a phase difference detection method by using a pair of parallax image signals corresponding to the third focus detection area.

10. The focus detection apparatus according to claim 1, wherein the second focus detection unit is configured to perform focus detection by obtaining an amount of correlation of the third focus detection area by adding an amount of correlation of the first focus detection area and an amount of correlation of the second focus detection area included in the third focus detection area, the amounts of correlation of the first focus detection area being obtained by the focus detection by the first focus detection unit.

11. The focus detection apparatus according to claim 1, wherein the processor or the circuit further functions as an input unit configured to receive input of the first focus detection area by a user.

12. The focus detection apparatus according to claim 1, wherein the reliability acquisition unit is configured to obtain the reliability of the focus detection of the first focus detection area and the reliability of the focus detection of the second focus detection area by using the pair of parallax image signals corresponding to each of the first and second focus detection areas.

13. The focus detection apparatus according to claim 1, wherein the reliability acquisition unit is configured to obtain the reliability of the focus detection of the first focus detection area and the reliability of the focus detection of the second focus detection area by using an image signal corresponding to a signal obtained by adding the pair of parallax image signals corresponding to each of the first and second focus detection areas.

14. The focus detection apparatus according to claim 1, wherein the first focus detection unit is configured to obtain either one of the pair of parallax image signals from the imaging signal and the other of the pair of parallax image signals corresponding to each of the first and second focus detection areas.

15. The focus detection apparatus according to claim 1, wherein the first threshold and the second threshold are equal.

16. The focus detection apparatus according to claim 1, further comprising a display unit configured to display the image based on the imaging signal, wherein the display unit is configured to display the first focus detection area.

17. A focus adjustment apparatus comprising:
the focus detection apparatus according to claim 1; and
wherein the processor or the circuit further functions as a focus lens control unit configured to control a position of a focus lens included in an imaging optical system by using a focus detection result of the third focus detection area by the second focus detection unit.

18. The focus adjustment apparatus according to claim 17, wherein the imaging optical system is configured separately from the focus adjustment apparatus, and wherein the focus lens control unit is configured to transmit position information about the focus lens to the imaging optical system.

19. An imaging apparatus comprising:
the focus adjustment apparatus according to claim 17;
wherein the processor or the circuit further functions as an image generation unit configured to generate an image by using the imaging signal obtained by the image sensor; and
a recording section configured to record the image generated by the image generation unit into a recording unit.

20. A focus detection method comprising:
setting a first focus detection area and a second focus detection area with respect to a captured image, the second focus detection area being positioned in a vicinity of the first focus detection area;
obtaining a pair of parallax image signals corresponding to each of the first and second focus detection areas, and performing, as first focus detection, focus detection of a phase difference detection method on each of the first and second focus detection areas by using the pair of parallax image signals;
obtaining reliability of the focus detection of each of the first and second focus detection areas through the first focus detection;
determining, as setting of the second focus detection area, a third focus detection area by using the obtained reliability; and
performing, as second focus detection, focus detection by using the third focus detection area,
wherein in a case where the reliability of a focus detection result of the first focus detection area is lower than a first threshold and the reliability of a focus detection result of the second focus detection area is higher than or equal to a second threshold, the first focus detection area is set as the third focus detection area through the setting of the second focus detection area, wherein the reliability of the focus detection level, steepness, and contrast information of the pair of parallax image signals corresponding to the first detection area, and wherein the reliability of the focus detection of the second focus detection area is at least one of coincidence level, steepness, and contrast information of the pair of parallax image signals corresponding to the second focus detection area.

* * * * *